United States Patent
Kong et al.

(10) Patent No.: US 8,264,997 B2
(45) Date of Patent: Sep. 11, 2012

(54) SYSTEM AND METHOD FOR PROVIDING MESSAGE PUSH SERVICE IN WIRELESS COMMUNICATION SYSTEM

(75) Inventors: Dong-Keon Kong, Suwon-si (KR); Jung-Je Son, Yongin-si (KR); Sung-Jin Lee, Suwon-si (KR); Ji-Cheol Lee, Yongin-si (KR); Hyoung-Kyu Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 12/700,559

(22) Filed: Feb. 4, 2010

(65) Prior Publication Data

US 2010/0195576 A1 Aug. 5, 2010

(30) Foreign Application Priority Data

Feb. 5, 2009 (KR) .................. 10-2009-0009415
Feb. 3, 2010 (KR) .................. 10-2010-0009875

(51) Int. Cl.
*G06C 17/00* (2006.01)
*H04W 4/00* (2009.01)
*H04B 1/16* (2006.01)
(52) U.S. Cl. ............... 370/311; 370/328; 455/343.2; 455/343.5
(58) Field of Classification Search .......... 370/311, 370/328; 455/343.2, 343.5
See application file for complete search history.

(56) References Cited

U.S. PATENT DOCUMENTS

| 6,704,295 | B1 | 3/2004 | Tari et al. |
| 6,763,373 | B2 * | 7/2004 | Shiigi .......................... 709/206 |
| 2004/0052212 | A1 | 3/2004 | Baillargeon |
| 2006/0274694 | A1 * | 12/2006 | Rajkumar et al. ........... 370/331 |
| 2007/0135866 | A1 * | 6/2007 | Baker et al. .................. 607/60 |
| 2009/0254669 | A1 * | 10/2009 | Deprun et al. ............... 709/229 |

FOREIGN PATENT DOCUMENTS

| KR | 10-0424447 B1 | 3/2004 |
| KR | 10-0476583 B1 | 3/2005 |
| KR | 10-0772498 B1 | 11/2007 |

* cited by examiner

*Primary Examiner* — Ronald Abelson
(74) *Attorney, Agent, or Firm* — Jefferson IP Law, LLP

(57) ABSTRACT

A method and a system for providing a push service in a wireless communication system adopting an Orthogonal Frequency Division Multiplexing (OFDM) scheme or an Orthogonal Frequency Division Multiple Access (OFDMA) scheme are provided. The method includes when receiving a message from another network or another messaging server, transmitting, at a messaging server, a push service request message to a push server; when a Mobile Station (MS) of which the push service is requested using the push service request message of the messaging server, operates in an awake mode, transmitting, at the push server, a first push deliver message comprising a message designated for the MS, to a Base Station (BS), and when receiving the first push deliver message, transmitting, at the BS, a second push deliver message based on a Media Access Control (MAC) layer comprising the message designated for the MS, to the MS.

24 Claims, 7 Drawing Sheets

SYSTEM AND METHOD FOR PROVIDING MESSAGE PUSH SERVICE IN WIRELESS COMMUNICATION SYSTEM

PRIORITY

This application claims the benefit under 35 U.S.C. §119 (a) of a Korean patent application filed in the Korean Intellectual Property Office on Feb. 5, 2009 and assigned Serial No. 10-2009-0009415, and an application filed in the Korean Intellectual Property Office on Feb. 3, 2010 and assigned Serial No. 10-2010-0009875, the contents of which are incorporated herein by reference.

BACKGROUND OF THE INVENTION

1. Field of the Invention

The present invention relates to a system and a method for providing a push service in a wireless communication system. More particularly, the present invention relates to a system and a method for transmitting a message using a Media Access Control (MAC) layer based push service in a wireless communication system.

2. Description of the Related Art

To facilitate a communication service, wireless communication systems provide a push service which actively transmits data from a server to a client without user's manipulation. For example, the push service includes a Wireless Application Protocol (WAP) push service, a HyperText Transfer Protocol (HTTP) push service, and a User Datagram Protocol (UDP) push service.

The WAP push service is designed for a voice service and may not be applied to a broadband wireless communication network.

The HTTP push service can be applied to the broadband wireless communication network but requires a Transmission Control Procedure (TCP) connection between a terminal and a push server for the push service. Hence, in every push service, the HTTP push service suffers from a time delay according to the TCP connection setup.

When a firewall exists between the push server and the terminal, the transmission of the push message can be blocked. As a result, the UDP push service cannot guarantee the service.

The broadband wireless communication system adopting an Orthogonal Frequency Division Multiplexing (OFDM) scheme or an Orthogonal Frequency Division Multiple Access (OFDMA) scheme does not specify a standard for transmitting and receiving data of the push characteristic.

Therefore, a need exists for a broadband wireless communication system and method for transmitting a push message to an application layer of other services without a TCP connection.

SUMMARY OF THE INVENTION

An aspect of the present invention is to address at least the above-mentioned problems and/or disadvantages and to provide at least the advantages described below. Accordingly, an aspect of the present invention is to provide a system and a method for providing a push service based on a Media Access Control (MAC) layer in a wireless communication system.

Another aspect of the present invention is to provide a system and a method for transmitting a message using a MAC layer based push service in a wireless communication system.

Yet another aspect of the present invention is to provide a system and a method for transmitting a short message using a MAC layer based push service in an Orthogonal Frequency Division Multiplexing (OFDM) wireless communication system.

Still another aspect of the present invention is to provide a system and a method for transmitting a multimedia message using a MAC layer based push service in an OFDM wireless communication system.

In accordance with an aspect of the present invention, a method for providing a push service in a wireless communication system adopting an Orthogonal Frequency Division Multiplexing (OFDM) scheme or an Orthogonal Frequency Division Multiple Access (OFDMA) scheme is provided. The method includes receiving a message from another network or another messaging server, transmitting, at a messaging server, a push service request message to a push server, when a Mobile Station (MS) of which the push service is requested using the push service request message of the messaging server operates in an awake mode, transmitting, at the push server, a first push deliver message comprising a message designated for the MS, to a Base Station (BS), and when receiving the first push deliver message, transmitting, at the BS, a second push deliver message based on a Media Access Control (MAC) layer comprising the message designated for the MS, to the MS.

In accordance with another aspect of the present invention, a wireless communication system for providing a push service and adopting an OFDM scheme or an OFDMA scheme is provided. The system includes a messaging server for, when receiving a message from another network or another messaging server, transmitting a push service request message to a push server, the push server for, when an MS of which the push service is requested using the push service request message of the messaging server operates in an awake mode, transmitting a first push deliver message comprising a message designated for the MS, to a BS, and the BS for, when receiving the first push deliver message, transmitting a second push deliver message based on a MAC layer comprising the message designated for the MS, to the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for transmitting a message using a push service based on a Media Access Control (MAC) layer in a wireless communication system.

Hereinafter, the wireless communication system is assumed to adopt an Orthogonal Frequency Division Multiplexing (OFDM) scheme or an Orthogonal Frequency Division Multiple Access (OFDMA) scheme.

Figure 1:
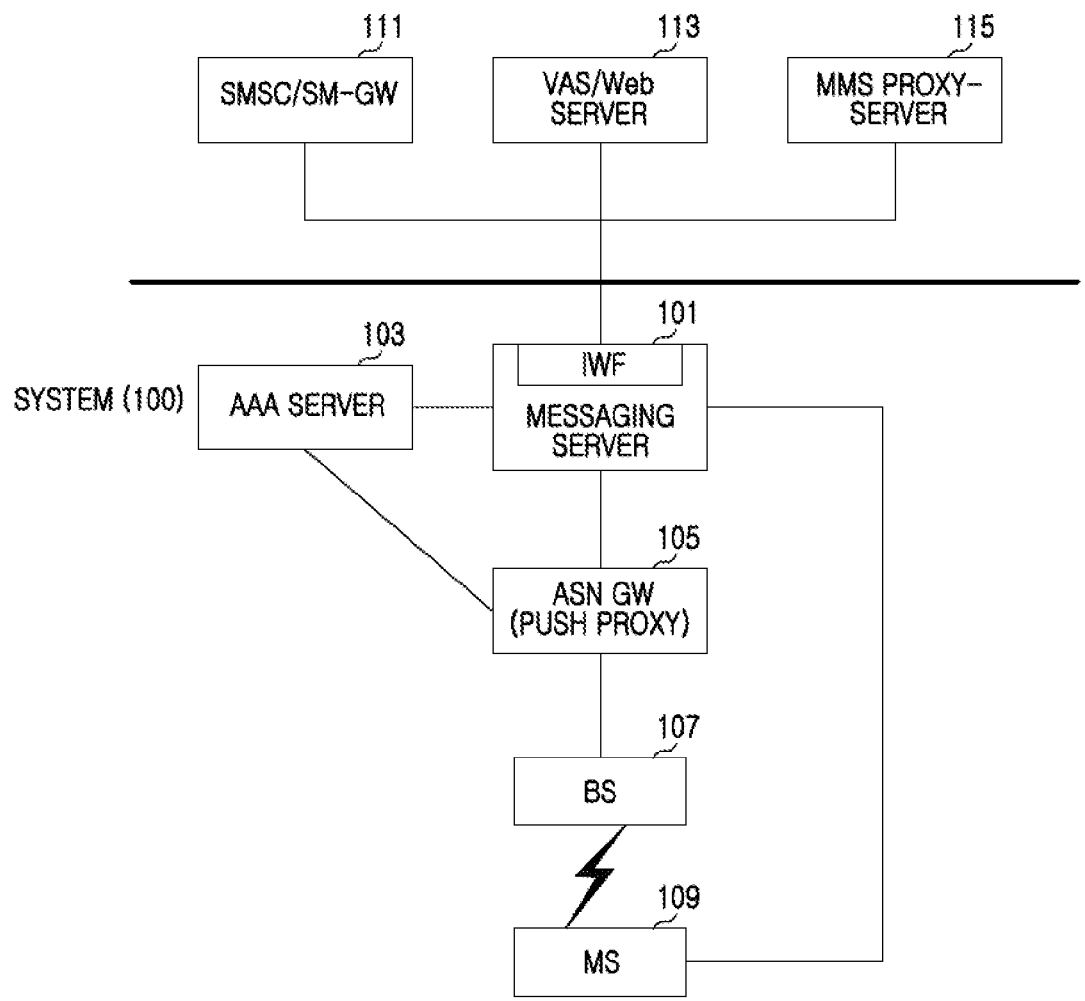
FIG. 1 is a block diagram illustrating a wireless communication system for a push service according to an exemplary embodiment of the present invention.

To provide the MAC layer based push service, the wireless communication system is constituted as illustrated in FIG. 1.

FIG. 1 is a block diagram illustrating a wireless communication system for a push service according to an exemplary embodiment of the present invention.

The wireless communication system 100 of FIG. 1 includes a messaging server 101, an Authentication, Authorization, and Accounting (AAA) server 103, an Access Service Network (ASN)-GateWay (GW) 105, a Base Station (BS) 107, and a Mobile Station (MS) 109.

The messaging server 101 controls message transmission and reception for a messaging service. That is, when a message to transmit to the MS 109 exists, the messaging server 101 requests a push to the ASN-GW 105 in order to transmit the message to the MS 109 using the push service. The messaging server 101 authenticates the MS 109 of the messaging service via the AAA server 103.

Regarding the message capacity, the messaging server 101 may directly transmit the message to the MS 109 using the push service.

The message server 101 controls to transmit and receive messages in association with a system 101 of a different communication scheme as well as another messaging server, via an InterWorking Function (IFW) server. For example, the messaging server 101 may be connected to another messaging server 101 using a WiMax Messaging (WM)4 interface. In addition, the messaging server 101 is connected to a Short Message Service Center (SMSC)/Short Message (SM)-GateWay (GW) 111 over a WM6 interface, a web based server 113 over a WM7 interface, and a Multimedia Message Service (MMS) proxy server 115 over a WM3 interface.

The AAA server 103 manages authentication and charging information. The AAA server 103 may include a Subscription Profile Repository (SPR) function for managing profile information per subscriber. The AAA server 103 may manage a secret key derived from an initial authentication and a life time.

The ASN-GW 105 controls operations of the BS and functions as a router.

The ASN-GW 105 includes a push proxy server and provides the push service. For example, when receiving the push request from the messaging server 101, the ASN-GW 105 transmits the message designated for the MS 109 to the BS 107 using the push service. When the MS 109 operates in an idle mode, the ASN-GW 105 performs a paging control function for paging the MS 109, and a push proxy function for transmitting the message using the push service.

The BS 107 transmits the message received from the ASN-GW 105 to the MS 109 through a radio link. The BS 107 transmits the message received from the MS 109 to the ASN-GW 105 over the radio link.

The MS 109 marks the message received from the BS 107 so that the user may identify the message, and transmits the message input from the user to the BS 107.

In an exemplary implementation, the ASN-GW 107 includes the push proxy server to function as the push proxy. Further, the push proxy server may be separated from the ASN-GW 105 and stand alone as a separate node.

Figure 2:
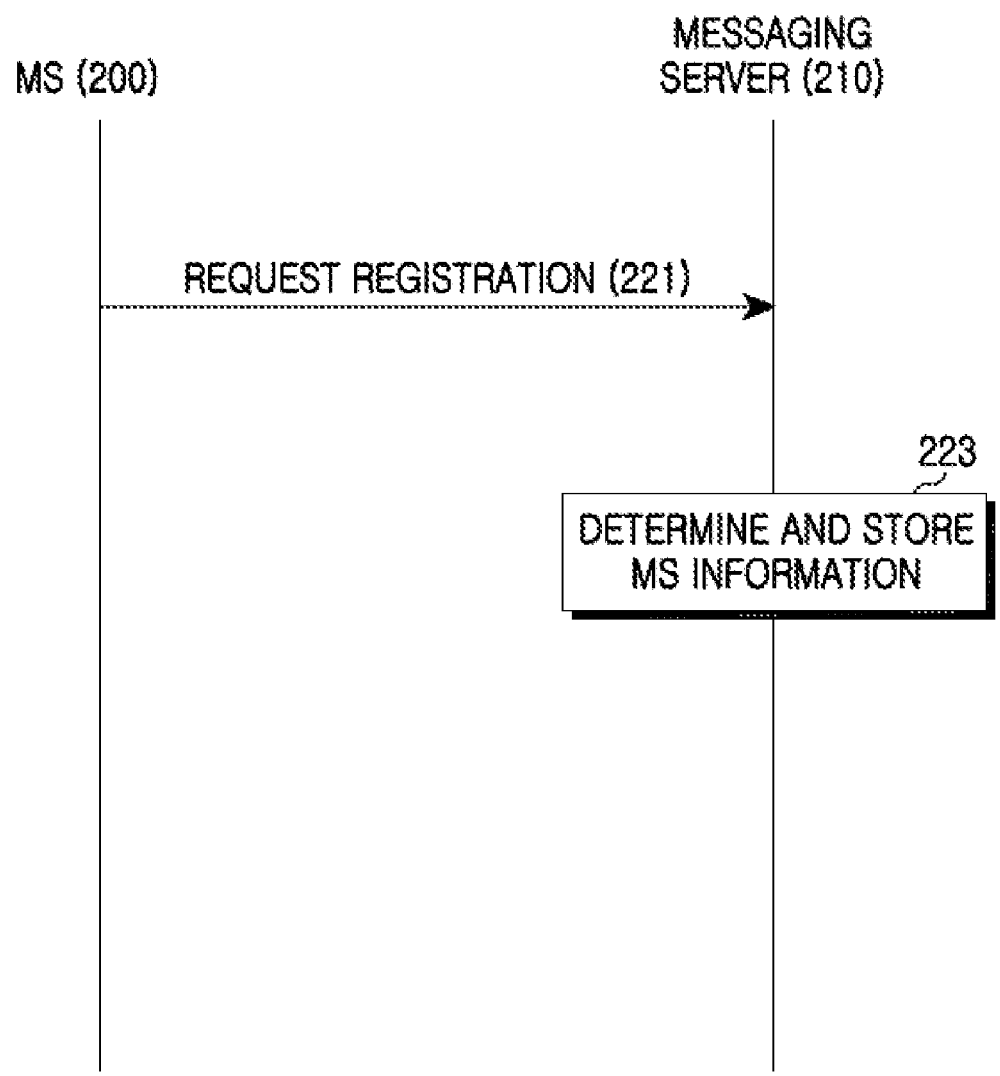
FIG. 2 is a flow diagram illustrating a registration procedure of a mobile station in a wireless communication system according to an exemplary embodiment of the present invention.

When the message is transmitted using the push service as described above, the MS may be registered to the messaging server as illustrated in FIG. 2.

FIG. 2 is a flow diagram illustrating a registration procedure of an MS in a wireless communication system according to an exemplary embodiment of the present invention.

When conducting a handover or network entry, the MS 200 requests registration to a messaging server 210 in step 221. The MS 200 uses at least one of its phone number, an Internet Protocol (IP) address, and a MAC address as its identifier.

The messaging server 210 stores a profile and a location of the MS 200 according to the registration request of the MS 200 in step 223.

In an exemplary implementation, the messaging server 210 stores a profile and a location of the MS 200.

Alternatively, when the MS 200 hands over or enters the network, an AAA server may store the profile and the location of the MS 200.

Hereinafter, a method for transmitting a message to the MS using a push service in the wireless communication system is explained. For example, the wireless communication system transmits the message to the MS using a RaNGing ReSPonse (RNG-RSP) message as illustrated in FIG. 3.

Figure 3:
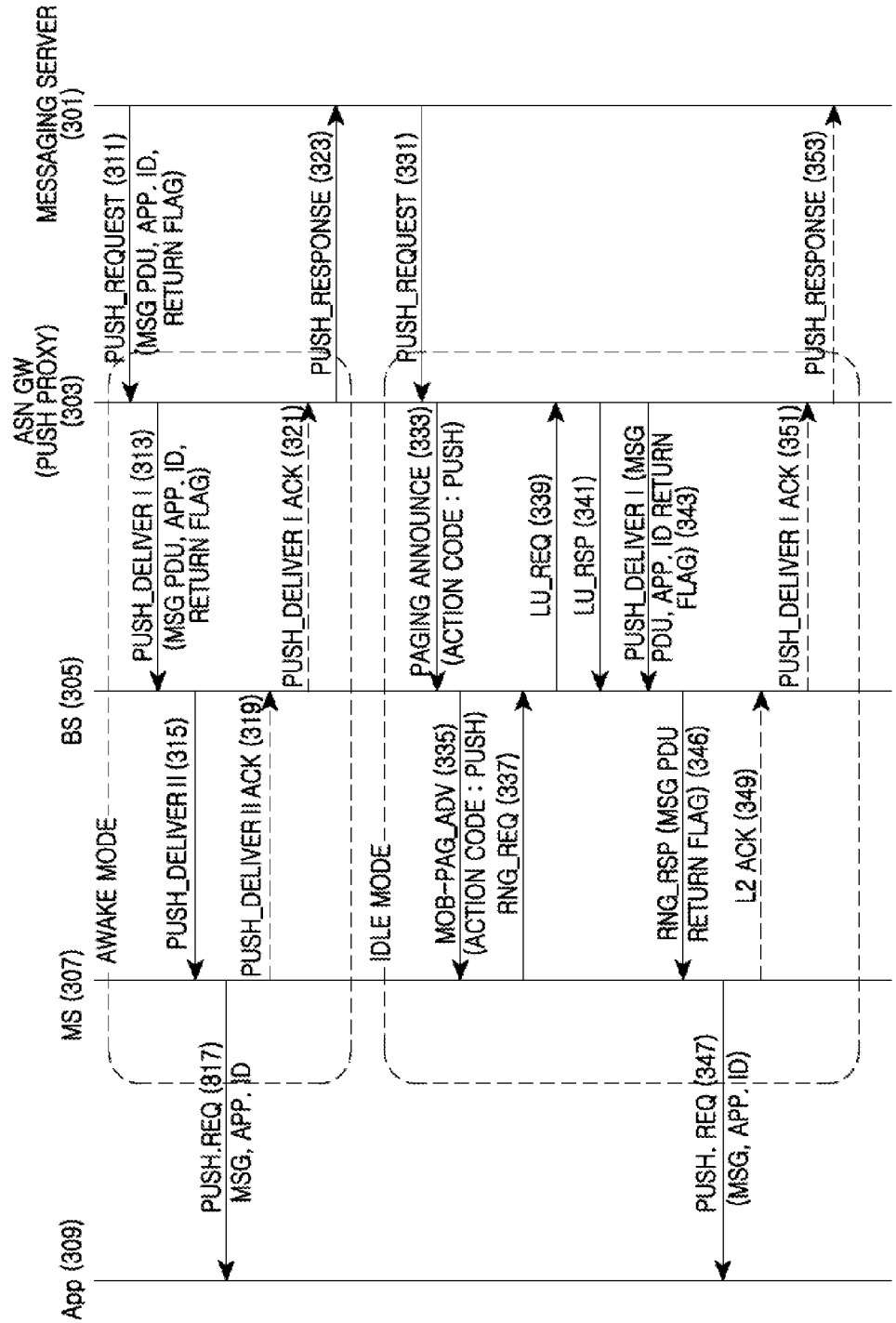
FIG. 3 is a flow diagram illustrating a process for a push service in a wireless communication system according to an exemplary embodiment of the present invention.

FIG. 3 is a flow diagram illustrating a process for a push service in a wireless communication system according to an exemplary embodiment of the present invention.

Hereinafter, at least one BS is represented by a BS 305. That is, the BS 305 may represent one specific BS or a plurality of BSs.

Referring to FIG. 3, when a message is to be transmitted to the MS 307 in an awake mode, the messaging server 301 requests a push to an ASN-GW 303 in step 311. The messaging server 301 transmits a Push_Request message including a message Packet Data Unit (PDU) to transmit to the MS 307, MS information, ASN-GW IDentification (ID), and a return flag to the ASN-GW 303. For example, the messaging server 301 may transmit the Push_Request message to the ASN-GW 303 via an AAA server. Herein, the message PDU includes an application ID. The application ID is an ID for identifying an application program which transmits the message among application programs of the MS 307. The return flag indicates whether the return for the push service is needed. For example, the Push_Request message may include information of Table 1.

TABLE 1

| Push Request Message | | |
|---|---|---|
| Attribute | M/O | Notes |
| MS Info | M | Include MS ID(Phone number, MAC ID or IP Address) |
| Transaction ID | M | Push Request ID |
| ASN-GW ID | M | |
| Messaging Server ID | M | Messaging Server ID |
| Return flag | O | |
| Length | M | PDU length is variable |
| MSG PDU | M | Push Message PDU(Packet Data Unit) |

The message PDU (MSG PDU) of Table 1 may include information of Table 2.

TABLE 2

| MSG PDU | | |
|---|---|---|
| Attribute | M/O | Notes |
| applicationID | M | Application type (e.g. ID for SMS/MMS) |
| MessageLength | M | Length of SMS or MMS |
| MessageContent | M | Content of SMS or MMS |

The ASN-GW 303 transmits a Push_Deliver I message including a message designated for the MS 307, to the BS 305 according to the push request of the messaging server 301 in step 313. The Push_Deliver I message includes a return flag and a push message PDU. Herein, the push message PDU includes the application ID. For example, the Push_Deliver I message may contain information of Table 3.

TABLE 3

| Push Deliver I Message | | |
|---|---|---|
| Attribute | M/O | Notes |
| MS Info | M | Include MS ID(Phone number, MAC ID or IP Address) |
| BS Info | M | Include BS ID |
| Return flag | O | |

TABLE 3-continued

| Push Deliver I Message | | |
|---|---|---|
| Attribute | M/O | Notes |
| Length | M | PDU length is variable |
| MSG PDU | M | Push Message PDU |

Figure 7:
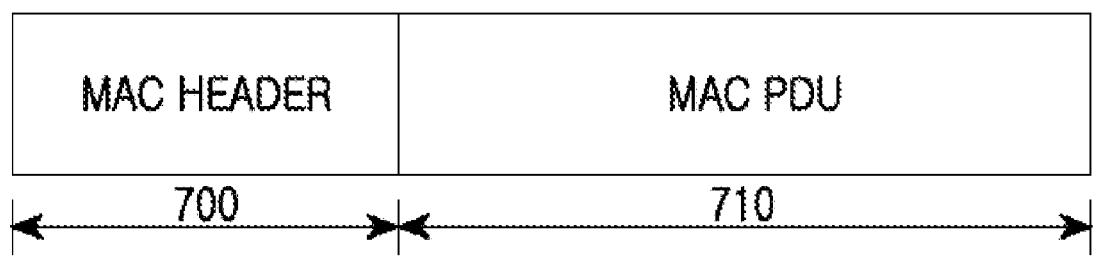
FIG. 7 is a diagram illustrating a push deliver message according to an exemplary embodiment of the present invention.

The BS 305 transmits a Push_Deliver II message including a message designated for the MS 307, to the MS 307 through the MAC layer in step 315. The Push_Deliver II message includes the push message PDU and a return flag. Herein, the Push_Deliver II message differs from the Push_Deliver I message. That is, while the Push_Deliver I message is transmitted over a wired network, the Push_Deliver II message is transmitted over a wireless network. Hence, the Push_Deliver I message and the Push_Deliver II message are embodied differently. For example, the Push_Deliver II message is constructed as illustrated in FIG. 7.

The MS 307 transmits the message, transmitted by the Push_Deliver II message received from the BS 305, to the application program 309 corresponding to the application ID in step 317.

The MS 307 determines whether to transmit a response message Push_Deliver II ACK for the push deliver message, based on the return flag of the Push_Deliver II message received from the BS 305. More specifically, when the return flag indicates that the return for the push service is unnecessary, the MS 307 does not transmit the response message for the Push_Deliver II message. When the return flag indicates that the return for the push service is necessary, the MS 307 transmits the response message for the Push_Deliver II message to the BS 305 in step 319.

Upon receiving the response message for the Push_Deliver II message, the BS 305 transmits a response message Push_Deliver I ACK to the ASN-GW 303 in response to the Push_Deliver I message in step 321. For example, the response message for the Push_Deliver I message may include information of Table 4.

TABLE 4

| Push Deliver I ACK | | |
|---|---|---|
| Attribute | M/O | Notes |
| MS Info | M | Include MS ID(Phone number, MAC ID or IP Address) |
| BS Info | M | Include BS ID |
| ASN-GW ID | M | ASN-GW ID |
| Failure Indication | O | Include Result code (omitted if success) |

When the push service for the message to the MS 307 succeeds, the ASN-GW 303 transmits a Push_Response message to the messaging server 301 in step 323. For example, when receiving the response message from the BS 305 in relation to the Push_Deliver I message, the ASN-GW 303 recognizes the successful push service. The Push_Response message may include information of Table 5.

TABLE 5

| Push Response | | |
|---|---|---|
| Attribute | M/O | Notes |
| MS Info | M | Include MS ID(Phone number, MAC ID or IP Address) |

TABLE 5-continued

Push Response

| Attribute | M/O | Notes |
|---|---|---|
| Transaction ID | M | the same as Transaction ID when Push Request message is received |
| Messaging Server ID | M | Messaging server ID |
| ASN-GW ID | M | ASN-GW ID |
| Failure Indication | O | Include Result code (omitted if success) |

Regarding a message to transmit to the MS 307 of an idle mode, the messaging server 301 requests the push to the ASN-GW 303 in step 331. The messaging server 301 transmits a Push_Request message including the message PDU to transmit to the MS 307 and the return flag to the ASN-GW 303. Herein, the message PDU includes the application ID.

According to the push request of the messaging server 301, the ASN-GW 303 transmits a Paging Announce message with an action code set to the push, to the BS 305 in step 333. The action code may be omitted.

The BS 305 transmits a MOB-PAG_ADV message with the action code set to the push, to the MS 307 in step 335. For example, the MOB-PAG_ADV message is embodied as shown in Table 6. The BS 305 transmits the MOB-PAG_ADV message by taking into account a listening interval of the MS 307.

TABLE 6

| Syntax | Size | Notes |
|---|---|---|
| MOB_PAG-ADV_Message_format( ){ | | |
|     Management Message Type=62 | 8 bits | |
|     Num_Paging_Group_IDs | 8 bits | |
| For(i=0;i<Num_Paging_Group_IDs;i++){ | | |
|     Paging Group ID | 16 bits | |
| } | | |
| Push Indication | 1 bit | Indication to Push |
|     if(Push Indication=1){ | | |
|         Action Code | 3 bits | 0b000 = No Action Required<br>0b001 = Perform Ranging to established location and ACK message<br>0b010 = Enter Network<br>0bxxx = Push |
|         Frame offset | 4 bits | |
|         Reserved | 1 bit | |
|     } | | |
|     else{ | | |
|         Num_MACs | 8 bits | |
|         For(j=0;j<Num_MACs;j++){ | | |
|             MS MAC Address Hash | 24 bits | |
|             Action Code | 3 bits | |
|             Frame offset | 4 bits | |
|             Reserved | 1 bit | |
|         } | | |
|     } | | |
| padding | variable | |
| TLV Encoded Information | | |
| } | | |

Herein, the MOB-PAG_ADV message includes a MOB-PAG_ADV_Message_format field including the embodied information of the message, and a Push Indication field including push service information. The MOB-PAG_ADV_Message_format field includes a Management Message Type field including type information of the message, Num_Paging_Group_IDs field including the number of paging group IDs, and a Paging Group ID field including paging group ID information of the MS 307 which transmits the MOB-PAG_ADV message. The Push Indication field includes an Action Code field indicative of the type of push service. The Action Code field may be omitted.

When the BS 305 provides the push service, the MOB-PAG_ADV message sets the action code of the Push Indication field to the push 'Obxxx'.

The MS 307, receiving the MOB-PAG_ADV message with the action code set to the push, transmits a RNG-REQ message to the BS 305 to receive the message in step 337. While staying in the idle mode rather than transiting to the awake mode, the MS 307 transmits the RNG-REQ message to the BS 305 to receive the message according to the push service.

Upon receiving the RNG-REQ message, the BS 305 notifies the ASN-GW 303 of the location of the MS 307 by transmitting a Location Update LU_REQ message to the ASN-GW 303 in step 339.

The ASN-GW 303 transmits a response message LU_RSP of the LU_REQ message to the BS 305 and thus updates the location in step 341.

When the BS 305 updates the location of the MS 307, the ASN-GW 303 recognizes that the MS 307 is connected to the BS 305. Hence, the ASN-GW 303 transmits a Push_Deliver I message including the message designated for the MS 307, to the BS 305 in step 343. Herein, the Push_Deliver I message includes the return flag and the push message PDU.

As receiving the Push_Deliver I message, the BS 305 transmits a RNG-RSP message to the MS 307 in step 345. The RNG-RSP message includes the push message PDU and the return flag.

The MS 307 transmits the message carried by the RNG-RSP message received from the BS 305, to the application program 309 corresponding to the application ID in step 347.

According to the return flag of the RNG-RSP message received from the BS 305, the MS 307 determines whether to transmit a response message for the push message PDU. In more detail, when the return flag indicates the unnecessary return for the push service, the MS 307 does not transmit the response message of the push message PDU to the BS 305. By contrast, when the return flag indicates the necessary return for the push service, the MS 307 transmits a L2 ACK message for the push message PDU to the BS 305 in step 349.

Upon receiving the L2 ACK message, the BS 305 transmits a Push_Deliver I ACK message to the ASN-GW 303 with respect to the Push_Deliver I message in step 351.

When the push service for the message to the MS 307 is successful, the ASN-GW 303 transmits a Push Response message to the messaging server 301 in step 353. For example, upon receiving the response message for the Push_Deliver I message from the BS 305, the ASN-GW 303 recognizes the success of the push service.

In an exemplary implementation, the ASN-GW 303 transmits the response message of the LU_REQ message and the Push_Deliver I message to the BS 305 in steps 341 and 343.

Alternatively, the ASN-GW 303 may transmit the response message of the LU_REQ message including the return flag and the push message PDU, to the BS 305. That is, the ASN-GW 303 may transmit the response message of the LU_REQ message including the data to transmit to the BS 305, to the BS 305 using the Push_Deliver I message.

Figure 4:
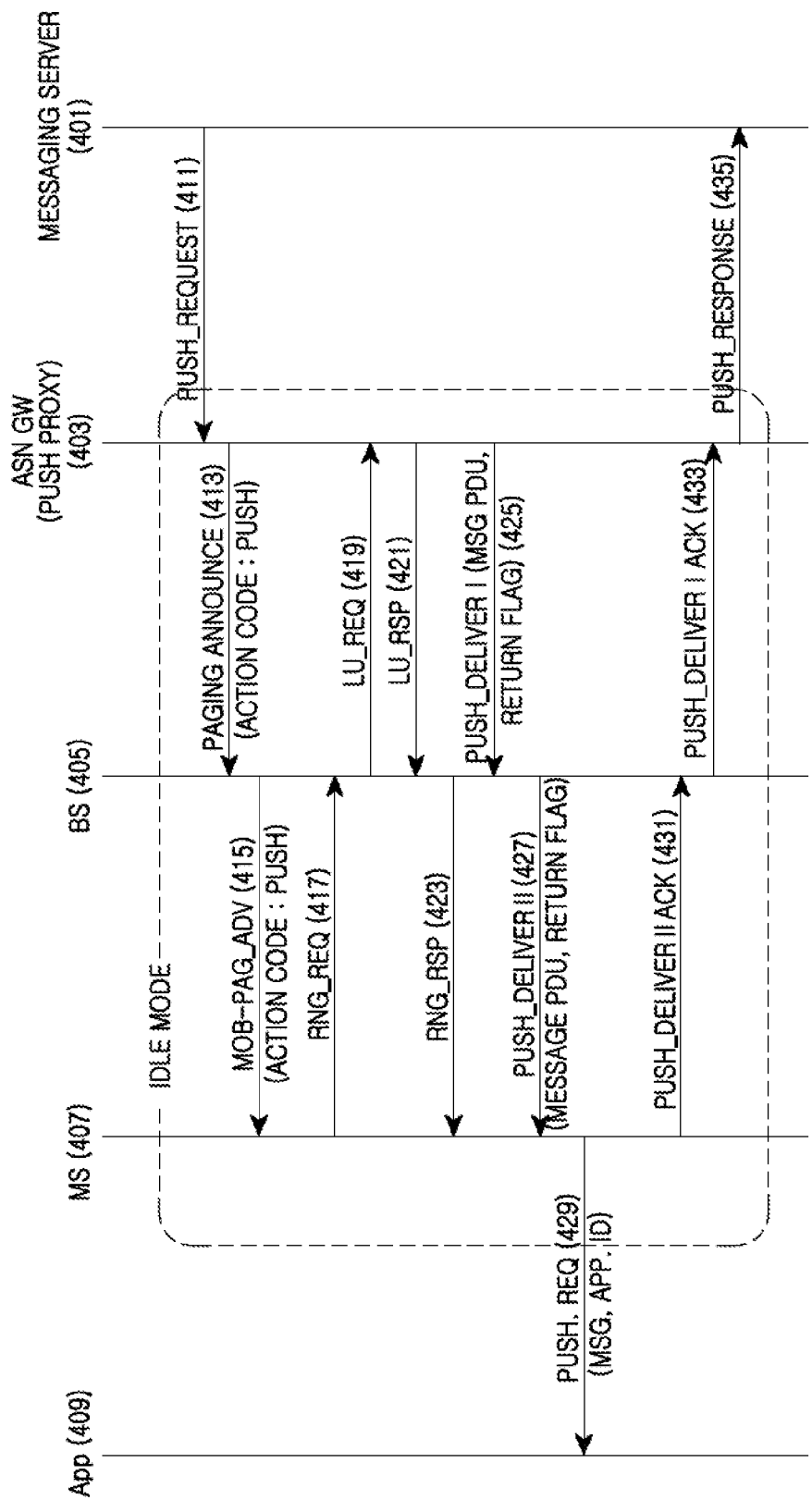
FIG. 4 is a flow diagram illustrating a process for a push service in a wireless communication system according to an exemplary embodiment of the present invention.

The wireless communication system may be able to transmit a message to the MS using a L2 transfer message as illustrated in FIG. 4.

FIG. 4 is a flow diagram illustrating a process for a push service in a wireless communication system according to an exemplary embodiment of the present invention.

It is assumed herein that an MS 407 operates in an idle mode. If the MS 407 operates in an awake mode, the wireless communication system operates in a similar method as illustrated in FIG. 3 where the MS 307 functions in the awake mode.

Regarding the message to transmit to the MS 407 of the idle mode, a messaging server 401 requests a push to an ASN-GW 403 in step 411. The messaging server 401 transmits a Push_Request message including a message PDU to transmit to the MS 407 and a return flag, to the ASN-GW 403. For example, the messaging server 401 may transmit the Push_Request message to the ASN-GW 403 via an AAA server. Herein, the message PDU includes an application ID.

According to the push request of the messaging server 401, the ASN-GW 403 transmits a Paging Announce message with an action code set to the push, to a BS 405 in step 413. The action code may be omitted.

The BS 405 transmits a MOB-PAG_ADV message with the action code set to the push, to the MS 407 in step 415. For example, the MOB-PAG_ADV message is embodied as shown in Table 6. The Action Code field may be omitted in Table 6.

Receiving the MOB-PAG_ADV message with the action code set to the push, the MS 407 transmits a RNG_REQ message to the BS 405 to receive the message in step 417. While in the idle mode rather than switching to the awake mode, the MS 407 transmits the RNG_REQ message to the BS 405 to receive the message according to the push service.

Upon receiving the RNG-REQ message, the BS 405 notifies the location of the MS by transmitting a LU-REQ message to the ASN-GW 403 in step 419.

The ASN-GW 403 transmits a LU_RSP message of the LU_REQ message to the BS 405 and thus updates the location in step 421.

As receiving the LU_RSP of the LU_REQ message, the BS 405 transmits a RNG-RSP message to the MS 407 in step 423.

Based on the LU_REQ message, the ASN-GW 403 recognizes that the MS 407 is connected to the BS 405. Accordingly, The ASN-GW 403 transmits a Push_Deliver I message including the message designated for the MS 407, to the BS 405 in step 425. The Push_Deliver I message includes the return flag and a push message PDU.

The BS 405 transmits a Push_Deliver II message including the message designated for the MS 407, to the MS 407 through the MAC layer in step 427. The Push_Deliver II message includes the return flag and the push message PDU. Herein, the Push_Deliver II differs from the Push_Deliver I message. Since the Push_Deliver I message is transmitted over a wired network and the Push_Deliver II message is transmitted over a wireless network, the Push_Deliver I message and the Push_Deliver II message are embodied differently. For example, the Push_Deliver II message is illustrated in FIG. 7.

The MS 407 transmits the message carried by the Push_Deliver II message received from the BS 405, to an application program 409 corresponding to the application ID in step 429.

Based on the return flag of the Push_Deliver II message received from the BS 405, the MS 407 determines whether to transmit a response message for the Push_Deliver II message. More specifically, when the return flag indicates that the return for the push service is unnecessary, the MS 407 does not transmit the response message for the Push_Deliver II message. When the return flag indicates that the return for the push service is necessary, the MS 407 transmits a Push_Deliver II ACK message for the Push_Deliver II message to the BS 405 in step 431.

Upon receiving the response message for the Push_Deliver II message, the BS 405 transmits a Push_Deliver I ACK message for the Push_Deliver I message to the ASN-GW 403 in step 433.

When the push service of the message to the MS 407 is successful, the ASN-GW 403 transmits a Push_Response message to the messaging server 401 in step 435. For example, when receiving the response message of the Push_Deliver I message from the BS 405, the ASN-GW 403 recognizes the success of the push service.

In an exemplary implementation, the ASN-GW 403 transmits the response message of the LU_REQ message and the Push_Deliver I message to the BS 405 in steps 421 and 425.

Alternatively, the ASN-GW 403 may transmit the response message of the LU_REQ message to the BS 405 by including the return flag and the push message PDU. That is, the ASN-GW 403 may be able to transmit the response message of the LU_REQ message including the data to transmit to the BS 405, to the BS 405 using the Push_Deliver I message.

As described above, the wireless communication system may transmit the message to the MS using the MAC layer based push service. Herein, the message transmitted to the MS includes at least one of a short message and a multimedia message. Since the sizes of the short message and the multimedia message are different from each other, the message may be transmitted in different manners. When may not transmit a message at a time through radio link, the BS may fragment and transmit the message.

Figure 5:
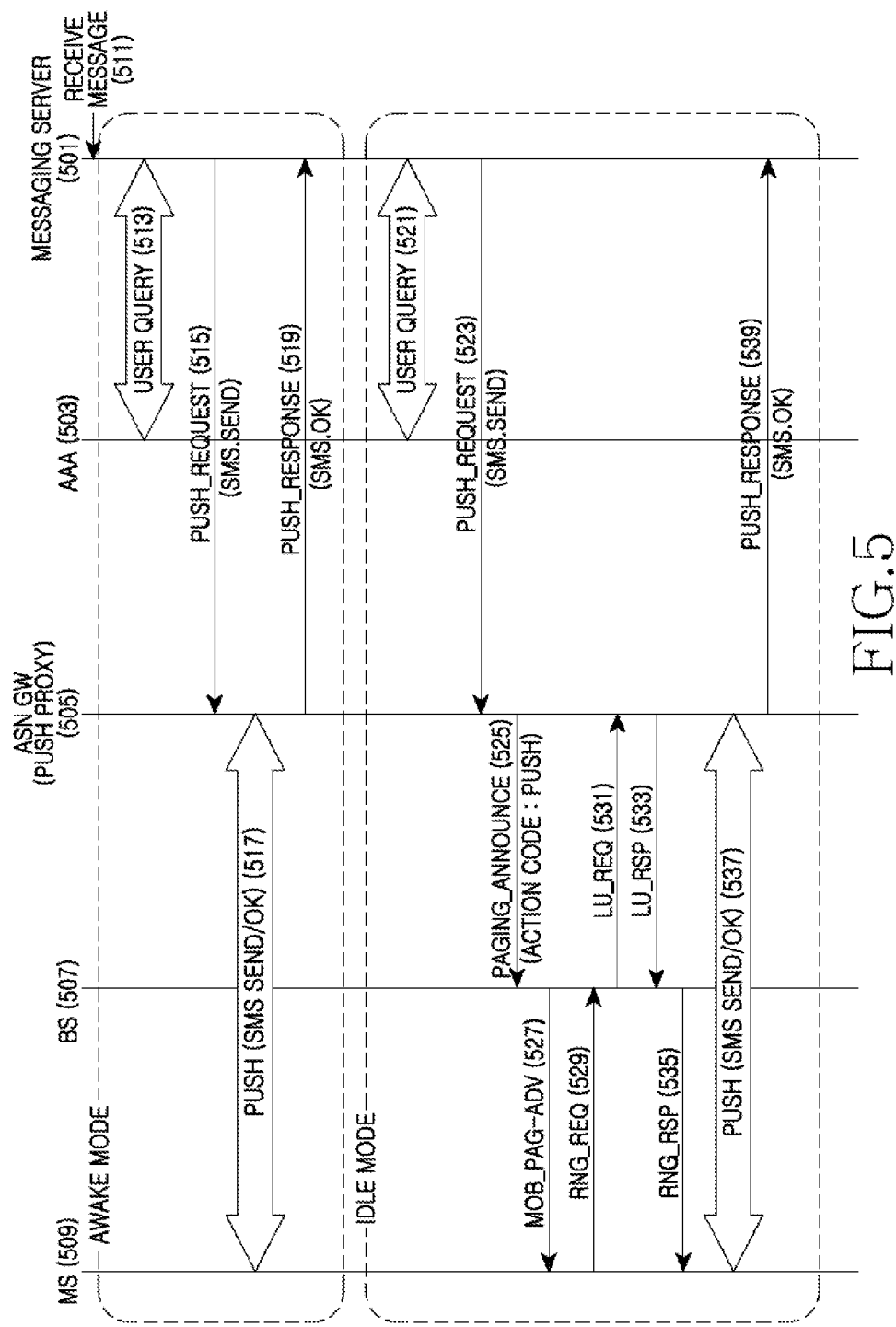
FIG. 5 is a flow diagram illustrating a process for transmitting a message using a push service in a wireless communication system according to an exemplary embodiment of the present invention.

To transmit the short message, the wireless communication system uses the push service based on the MAC layer as illustrated in FIG. 5.

FIG. 5 is a flow diagram illustrating a process for transmitting a message using a push service in a wireless communication system according to an exemplary embodiment of the present invention.

For the message designated for an MS 509 operating in an awake mode in step 511, a messaging server 501 acquires information of the MS 509 from an AAA server 503 in step 513.

The messaging server 501 requests a push to an ASN-GW 505 in step 515. The messaging server 501 transmits a Push_Request message including the message designated for the MS 509, to the ASN-GW 505. For example, the message server 501 may transmit the Push_Request message to the ASN-GW 505 via the AAA server 503.

The ASN-GW 505 transmits the message to the MS 509 via the BS 507 using the push service in step 517. For example, the ASN-GW 505 transmits a Push_Deliver I message including the message designated for the MS 509, to the BS 507 according to the push request of the messaging server 501. The BS 507 transmits a Push_Deliver II message of the MAC layer including the message to the MS 509, to the MS 509. The Push_Deliver I message is transmitted over a wired network, whereas the Push_Deliver II message is transmitted over a wireless network. Naturally, the Push_Deliver I message and the Push_Deliver II message are embodied differently.

When the push service of the message to the MS 509 is successful, the ASN-GW 505 transmits a Push_Response message to the messaging server 501 in step 519. For example, when receiving the response message of the Push_Deliver I message from the BS 507, the ASN-GW 505 recognizes the success of the push service.

Regarding the message to the MS 509 in an idle mode in step 511, the messaging server 501 acquires information of the MS 509 from the AAA server 503 in step 521.

The messaging server 501 requests the push to the ASN-GW 505 in step 523. The message server 501 transmits a Push_Request message including the message designated for the MS 509, to the ASN-GW 505.

According to the push request of the messaging server 501, the ASN-GW 505 transmits a Paging_Announce message with an action code set to the push, to the BS 507 in step 525. The action code may be omitted.

The BS 507 transmits a MOB-PAG_ADV message with the action code set to the push, to the MS 509 in step 527. For example, the MOB-PAG_ADV message is shown in Table 6. The Action Code field may be omitted in Table 6.

Upon receiving the MOB-PAG_ADV message with the action code set to the push, the MS 509 transmits a RNG-REQ message to the BS 507 to receive the message from the BS 507 in step 529. Accordingly, the MS performs only a ranging procedure with the BS 507 to receive the message according to the push service, while staying in the idle mode rather than transiting to the awake mode.

Receiving the RNG-REQ message, the BS 507 notifies the location of the MS by transmitting a LU_REQ message to the ASN-GW 505 in step 531.

The ASN-GW 505 updates the location by transmitting a LU_RSP message of the LU_REQ message to the BS 507 in step 533.

While receiving the response message of the LU_REQ message, the BS 507 transmits a RNG-RSP message to the MS 509 in step 535.

The ASN-GW 505 transmits the message to the MS 509 via the BS 507 using the push service in step 537. For example, according to the push request of the messaging server 501, the ASN-GW 505 transmits the Push_Deliver I message including the message designated for the MS 509, to the BS 507. The BS 507 transmits the Push_Deliver II message of the MAC layer including the message designated for the MS 509, to the MS 509. While the Push_Deliver I message is transmitted over a wired network, the second Push_Deliver II message is transmitted over a wireless network. Thus, the Push_Deliver I message and the Push_Deliver II message are embodied differently.

When the push service of the message to the MS 509 is successful, the ASN-GW 505 transmits a Push_Response message to the messaging server 501 in step 539. For example, the ASN-GW 505 recognizes the success of the push service when the response message of the Push_Deliver I message is received from the BS 507.

In an exemplary implementation, the messaging server 501 obtains information of the MS 509 from an AAA server 503. In a handover or a network entry, the MS 509 registers a profile and location information to the AAA server 503.

Alternatively, when the MS 509 registers the profile and the location information to the messaging server 501, the messaging server 501 may omit to acquire the information of the MS 509 from the AAA server 503.

In an exemplary implementation, when the MS 509 operates in the idle mode, the BS 507 transmits the RNG-RSP message to the MS 509 and then transmits the Push_Deliver II message including the message for the MS 509, to the MS 509.

Alternatively, the BS 507 may transmit the RNG-RSP message including the message the MS 509, to the MS 509. In this case, the ASN-GW 505 transmits the Push_Deliver I message to the BS 507 before the BS 507 transmits the RNG-RSP message. Herein, the RNG-RSP message includes the push message PDU and the return flag.

Figure 6:
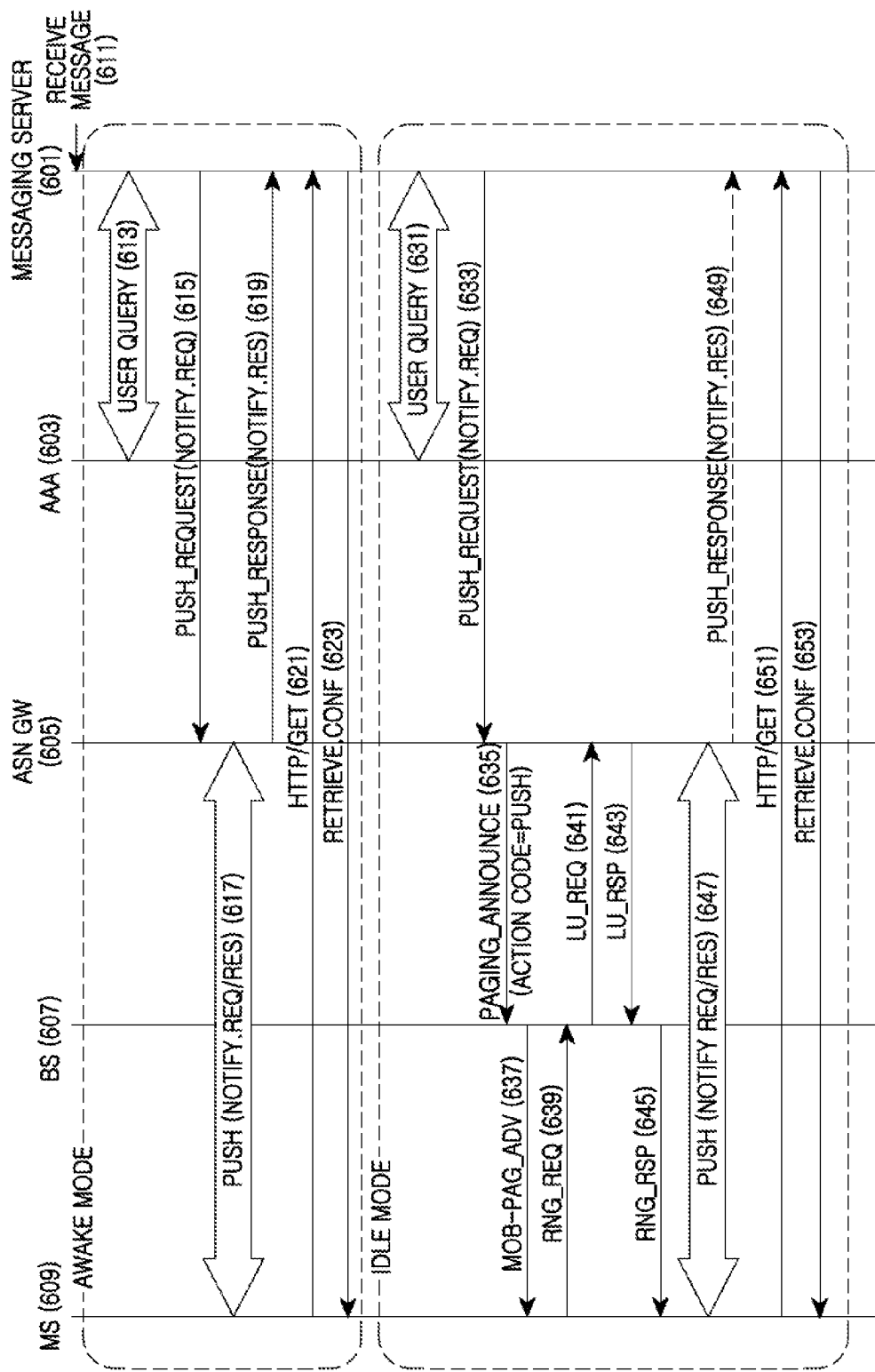
FIG. 6 is a flow diagram illustrating a process for transmitting a message using a push service in a wireless communication system according to an exemplary embodiment of the present invention.

To transmit a multimedia message, the wireless communication system uses the push service based on the MAC layer as illustrated in FIG. 6.

FIG. 6 is a flow diagram illustrating a process for transmitting a message using the push service in a wireless communication system according to an exemplary embodiment of the present invention.

Referring to FIG. 6, for a message to transmit to an MS 609 of an awake mode in step 611, the messaging server 601 acquires information of the MS 609 from an AAA server 603 in step 613.

The messaging server 601 requests a push to the ASN-GW 605 in step 615. The messaging server 601 transmits a Push_Request (Notify.req) message according to the push service to the ASN-GW 605. Herein, the Push_Request (Notify.req) message includes an address of a media server.

Using the push service, the ASN-GW 605 transmits the Push_Request (Notify.req) message to the MS 609 via the BS 607 in step 617. The ASN-GW 605 transmits a first Push_Request (Notify.req) message to the BS 607 over a wired network and the BS 607 transmits a second Push_Request (Notify.req) message to the MS 609 over a wireless network. Accordingly, the first Push_Request (Notify.req) message and the second Push_Request (Notify.req) message are embodied differently. Herein, the Push_Request (Notify.req) message includes the address of the media server.

When successfully transmitting the Push_Request (Notify.req) message according to the push service to the MS 609, the ASN-GW 605 transmits a Push_Response (Notify.res) message to the messaging server 601 in step 619.

The MS 609 obtains the address of the media server from the Push_Request (Notify.req) message received from the BS 607. The MS 609 requests the message transfer to the media server using an acquired address of the media server in step 621. For example, the MS 609 requests the message transfer to the media server using the acquired address of the media server in a 'GET' method of a HyperText Transfer Protocol (HTTP).

As requested by the MS 609, the media server transmits the message to the MS 609 in step 623. For example, the media server encapsulates a message converted for a profile of the MS 609 according to the HTTP protocol and transmits the encapsulated message to the MS 609 as requested by the MS 609.

For a message to transmit to the MS 609 in an idle mode in step 611, the messaging server 601 obtains the information of the MS 609 from the AAA server 603 in step 631.

The messaging server 601 requests the push to the ASN-GW 605 in step 633. The messaging server 601 transmits the Push_Request (Notify.req) of the push service to the ASN-GW 605. Herein, the Push_Request (Notify.req) message includes the address of the media server.

Upon receiving the Push_Request (Notify.req) message from the messaging server 601, the ASN-GW 605 transmits a Paging_Announce message with an action code set to the push, to the BS 607 in step 635.

The BS 607 transmits a MOB-PAG_ADV message with the action code set to the push, to the MS 609 in step 637. For example, the MOB-PAG_ADV message is shown in Table 6.

Receiving the MOB-PAG_ADV message with the action code defined as the push, the MS 609 transmits a RNG-REQ message to the BS 607 to receive the message from the BS 607 in step 639. Accordingly, while staying in the idle mode rather than switching to the awake mode, the MS 609 transmits the RNG-REQ message to the BS 607 to receive the message according to the push service.

Upon receiving the RNG-REQ message, the BS 607 notifies a location of the MS by transmitting a LU-REQ message to the ASN-GW 605 in step 641.

The ASN-GW 605 transmits a LU_RSP message of the LU_REQ message to the BS 607 and thus updates the location in step 643.

As receiving the response message of the LU_REQ message, the BS 607 transmits a RNG-RSP message to the MS 609 in step 645.

Using the push service, the ASN-GW 605 transmits the Push_Request (Notify.req) message to the MS 609 via the BS 607 in step 647. The ASN-GW 605 transmits a first Push_Request (Notify.req) message to the BS 607 over the wired network and the BS 607 transmits a second Push_Request (Notify.req) message to the MS 609 over the wireless network. Accordingly, the first Push_Request (Notify.req) message and the second Push_Request (Notify.req) message are embodied differently. Herein, the Push_Request (Notify.req) message includes the address of the media server.

When successfully transmitting the Push_Request (Notify.req) message of the push service to the MS 609, the ASN-GW 605 transmits a Push_Response (Notify.res) message to the messaging server 601 in step 649.

The MS 609 obtains the address of the media server from the Push_Request (Notify.req) message received from the BS 607. The MS 609 requests the message transfer to the media server using the acquired address of the media server in step 651. For instance, the MS 609 requests the message transfer to the media server using the acquired address of the media server in a 'GET' method of an HTTP.

As requested by the MS 609, the media server transmits the message to the MS 609 in step 653. For example, the media server encapsulates the message converted for the profile of the MS 609 according to the HTTP and transmits the encapsulated message to the MS 609 as requested by the MS 609.

In an exemplary implementation, the messaging server 601 acquires the information of the MS 609 from the AAA server 603. As a result, when handing over or entering a network, the MS 609 registers its profile and location information to the AAA server 603.

Alternatively, when the MS 609 registers the profile and the location information to the messaging server 601, the messaging server 601 may omit to obtain the information of the MS 609 from the AAA server 603.

In an exemplary implementation, when the MS 609 operates in the idle mode, the BS 607 transmits the RNG-RSP message to the MS 609 and then transmits the Push_Deliver II message including the Push_Request (Notify.req) message to the MS 609.

Alternatively, the BS may transmit the RNG-RSP message including the Push_Request (Notify.req) message to the MS 609. In this case, the ASN-GW 605 needs to transmit the Push_Deliver I message including the Push_Request (Notify.req) message to the BS 607 before the BS 607 transmits the RNG-RSP message.

As illustrated in FIG. 6, the wireless communication system transmits the multimedia message to the MS using the MAC layer based push service.

Alternatively, when the size of the multimedia message is small, the wireless communication system may transmit the multimedia message using the MAC layer based push service as illustrated in FIG. 5.

FIG. 7 is a diagram illustrating a push deliver message according to an exemplary embodiment of the present invention.

Hereinafter, a Push_Deliver I message is transmitted from an ASN-GW 303 to a BS 305, and a Push_Deliver II message is transmitted from the BS 305 to a MS 307 as illustrated in FIG. 3.

Referring to FIG. 7, the push deliver message of a MAC layer adds a MAC PDU 710 to a MAC header 700.

The MAC PDU 710 of the Push_Deliver II message includes a PDU of the Push_Deliver I message.

The PDU of the Push_Deliver II message includes a push application ID and a push message PDU. Herein, the push application ID indicates a type of push message. For example, when the push message is a short message, the application ID is set to 1. When the push message is a multimedia message, the push application ID is set to 2.

As set forth above, a message is transmitted using a push service based on a MAC layer in a wireless communication system. Therefore, the message may be delivered without a connection setup of a Transmission Control Procedure (TCP) upper layer, a MS of an idle mode may avoid an unnecessary transition to an awake mode to receive the message, and the message may be transmitted to the application layer of other services. Further, a message blocked in a firewall or a Network Address Translation (NAT) may be addressed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a push service in a wireless communication system adopting any one of an Orthogonal Frequency Division Multiplexing (OFDM) scheme and an Orthogonal Frequency Division Multiple Access (OFDMA) scheme, the method comprising:

when receiving a message from at least one of another network and another messaging server, transmitting, at a messaging server, a push service request message to a push server;

when a Mobile Station (MS) of which the push service is requested using the push service request message of the messaging server, operates in an awake mode, transmitting, at the push server, a first push deliver message comprising a message designated for the MS, to a Base Station (BS); and when receiving the first push deliver message, transmitting, at the BS, a second push deliver message based on a Media Access Control (MAC) layer comprising the message designated for the MS, to the MS, wherein the push service request message comprises at least one of MS identification information, a transaction ID, a push server ID, a messaging server ID, a return flag, length information of Packet Data Unit (PDU), and a message PDU, and wherein the message PDU comprises at least one of an application ID, message length information, and a message content.

2. The method of claim 1, wherein the push server is comprised in an Access Service Network (ASN)-GateWay (GW).

3. The method of claim 1, wherein the first push deliver message comprises at least one of MS identification information, BS identification information, a return flag, length of Packet Data Unit (PDU), and a message PDU.

4. The method of claim 1, further comprising:
when receiving the second push deliver message, confirming, at the MS, the message and an application program ID which is to use the message from the second push deliver message;
forwarding, at the MS, the message to a corresponding application program using the application program ID; and
when a return of the second push deliver message is required, transmitting, at the MS, a response message of the second push deliver message to the BS.

5. The method of claim 4, further comprising:
when receiving the response message of the second push deliver message, transmitting, at the BS, a response message of the first push deliver message to the push server; and
when receiving the response message of the first push deliver message, transmitting, at the push server, a response message of the push service request message to the messaging server.

6. The method of claim 5, wherein the response message of the first push deliver message comprises at least one of MS identification information, BS identification information, a push server ID, and a transmission result of the first push deliver message.

7. The method of claim 5, wherein the response message of the push service request message comprises at least one of MS identification information, a transaction ID, a messaging server ID, a push server ID, and a transmission result of the push service request message.

8. The method of claim 1, further comprising:
when the MS of which the push service is requested using the push service request message of the messaging server operates in an idle mode, transmitting, at the push server, a paging signal to the MS via the BS;
when receiving the paging signal, transmitting, at the MS, a ranging request message to the BS;
when receiving the ranging request message, updating, at the BS, a location of the MS with the push server;
transmitting, at the push server, a first push deliver message comprising a message designated for the MS, to the BS; and
when receiving the first push deliver message, transmitting, at the BS, a ranging response message comprising the message designated for the MS, to the MS.

9. The method of claim 8, further comprising:
when a return of the message comprised in the ranging response message is required, transmitting, at the MS, a response message for the message to the BS;
when receiving the response message of the message, transmitting, at the BS, a response message of the first push deliver message to the push server; and
when receiving the response message of the first push deliver message, transmitting, at the push server, a response message of the push service request message to the messaging server.

10. The method of claim 1, further comprising:
when the MS of which the push service is requested using the push service request message of the messaging server operates in an idle mode, transmitting, at the push server, a paging signal to the MS via the BS;
when receiving the paging signal, transmitting, at the MS, a ranging request message to the BS;
when receiving the ranging request message, updating, at the BS, a location of the MS with the push server;
transmitting, at the BS, a ranging response message to the MS;
transmitting, at the push server, a first push deliver message comprising a message designated for the MS, to the BS; and
when receiving the first push deliver message, transmitting, at the BS, a second push deliver message comprising the message designated for the MS, to the MS.

11. The method of claim 10, further comprising:
when a return of the second push deliver message is required, transmitting, at the MS, a response message of the second push deliver message to the BS;
when receiving the response message of the second push deliver message, transmitting, at the BS, a response message of the first push deliver message to the push server; and
when receiving the response message of the first push deliver message, transmitting, at the push server, a response message of the push service request message to the messaging server.

12. A wireless communication system for providing a push service and adopting any one of an Orthogonal Frequency Division Multiplexing (OFDM) scheme and an Orthogonal Frequency Division Multiple Access (OFDMA) scheme, the system comprising:
a messaging server for, when receiving a message from at least one of another network another messaging server, transmitting a push service request message to a push server;
the push server for, when a Mobile Station (MS) of which the push service is requested using the push service request message of the messaging server operates in an awake mode, transmitting a first push deliver message comprising a message designated for the MS, to a Base Station (BS); and
the BS for, when receiving the first push deliver message, transmitting a second push deliver message based on a Media Access Control (MAC) layer comprising the message designated for the MS, to the MS,
wherein the push service request message comprises at least one of MS identification information, a transaction ID, a push server ID, a messaging server ID, a return flag, length information of Packet Data Unit (PDU), and a message PDU, and
wherein the message PDU comprises at least one of an application ID, message length information, and a message content.

13. The system of claim 12, wherein the push server is comprised in an Access Service Network (ASN)-GateWay (GW).

14. The system of claim 12, wherein the first push deliver message comprises at least one of MS identification information, BS identification information, a return flag, length of Packet Data Unit (PDU), and a message PDU.

15. The system of claim 12, wherein the MS, when receiving the second push deliver message, confirms the message and an application program ID which is to use the message from the second push deliver message and forwards the message to a corresponding application program using the application program ID, and
when a return of the second push deliver message is required, the MS transmits a response message of the second push deliver message to the BS.

16. The system of claim 15, wherein the BS, when receiving the response message of the second push deliver message, transmits a response message of the first push deliver message to the push server, and
when receiving the response message of the first push deliver message, the push server transmits a response message of the push service request message to the messaging server.

17. The system of claim 16, wherein the response message of the first push deliver message comprises at least one of MS identification information, BS identification information, a push server ID, and a transmission result of the first push deliver message.

18. The system of claim 16, wherein the response message of the push service request message comprises at least one of MS identification information, a transaction ID, a messaging server ID, a push server ID, and a transmission result of the push service request message.

19. The system of claim 12, wherein the push server, when the MS of which the push service is requested using the push service request message of the messaging server operates in an idle mode, transmits a paging signal to the MS via the BS,
when receiving the paging signal, the MS transmits a ranging request message to the BS,
when receiving the ranging request message, the BS updates a location of the MS with the push server,
the push server transmits a first push deliver message comprising a message designated for the MS, to the BS, and
when receiving the first push deliver message, the BS transmits a ranging response message comprising the message designated for the MS, to the MS.

20. The system of claim 19, wherein, when a return of the message comprised in the ranging response message is required, the MS transmits a response message for the message to the BS,
when receiving the response message of the message, the BS transmits a response message of the first push deliver message to the push server, and
when receiving the response message of the first push deliver message, the push server transmits a response message of the push service request message to the messaging server.

21. The system of claim 12, wherein, when the MS of which the push service is requested using the push service request message of the messaging server operates in an idle mode, the push server transmits a paging signal to the MS via the BS,
when receiving the paging signal, the MS transmits a ranging request message to the BS,
when receiving the ranging request message, the BS updates a location of the MS with the push server,
the BS transmits a ranging response message to the MS,
the push server transmits a first push deliver message comprising a message designated for the MS, to the BS, and
when receiving the first push deliver message, the BS transmits a second push deliver message comprising the message designated for the MS, to the MS.

22. The system of claim 21, wherein, when a return of the second push deliver message is required, the MS transmits a response message of the second push deliver message to the BS,
when receiving the response message of the second push deliver message, the BS transmits a response message of the first push deliver message to the push server, and
when receiving the response message of the first push deliver message, the push server transmits a response message of the push service request message to the messaging server.

23. A method for providing a push service in a wireless communication system adopting any one of an Orthogonal Frequency Division Multiplexing (OFDM) scheme and an Orthogonal Frequency Division Multiple Access (OFDMA) scheme, the method comprising:
receiving a message from at least one of another network and another messaging server;
transmitting, at a messaging server, a push service request message to a push server when the messaging server receives the message from the at least one of another and another messaging server;
determining whether a Mobile Station (MS) of which the push service is requested using the push service request message of the messaging server operates in an awake mode or an idle mode; and
transmitting to the MS a message comprising the message designated for the MS according to different methods based on whether the MS is determined to be operating in the awake mode or the idle mode.

24. The method of claim 23, wherein if the MS of which the push service is requested using the push service request message of the messaging server, is determined to be operating in an awake mode, then (i) transmitting, at the push server, a first push deliver message comprising a message designated for the MS, to a Base Station (BS), and (ii) transmitting, at the BS, a second push deliver message based on a Media Access Control (MAC) layer comprising the messaged designated for the MS, to the MS upon receipt of the first push deliver message, and
wherein if the MS of which the push service is requested using the push service request message of the messaging server, is determined to be operating in an idle mode, then (i) performing a paging sequence between the MS and the BS, (ii) transmitting, at the push server, a first push deliver message comprising a messaged designated for the MS, to the BS, (iii) transmitting a second push deliver message comprising the message designated for the MS, to the MS, upon receipt of the first push deliver message.

* * * * *